(12) United States Patent
Haynes et al.

(10) Patent No.: US 11,467,065 B2
(45) Date of Patent: Oct. 11, 2022

(54) HYDRO-MAGNETIC LINEAR ACTUATOR

(71) Applicant: Libertine FPE Ltd, York (GB)

(72) Inventors: Edward Haynes, York (GB); Samuel Cockerill, York (GB)

(73) Assignee: Libertine FPE Ltd, York (GB)

( * ) Notice: Subject to any disclaimer, the term of this patent is extended or adjusted under 35 U.S.C. 154(b) by 467 days.

(21) Appl. No.: 16/483,640

(22) PCT Filed: Dec. 21, 2017

(86) PCT No.: PCT/GB2017/053858
§ 371 (c)(1),
(2) Date: Aug. 5, 2019

(87) PCT Pub. No.: WO2018/142096
PCT Pub. Date: Aug. 9, 2018

(65) Prior Publication Data
US 2020/0124500 A1   Apr. 23, 2020

(51) Int. Cl.
*H02K 11/215* (2016.01)
*F16C 32/06* (2006.01)
(Continued)

(52) U.S. Cl.
CPC ......... *G01M 17/0074* (2013.01); *F16C 32/06* (2013.01); *G01M 7/02* (2013.01);
(Continued)

(58) Field of Classification Search
CPC ...... H02K 11/215; H02K 7/08; H02K 5/1672; G01M 7/022; G01M 7/04; G01M 7/02;
(Continued)

(56) References Cited

U.S. PATENT DOCUMENTS 4,247,794 A * 1/1981 Jooss ................. H02K 41/0356
310/13
4,415,821 A * 11/1983 Wedman ................ G11B 21/08
310/12.19

(Continued)

FOREIGN PATENT DOCUMENTS

| CN | 2545747 | 4/2003 |
|---|---|---|
| CN | 101248344 | 8/2008 |
| JP | 2011193641 | 9/2011 |

OTHER PUBLICATIONS

Office Action corresponding to Chinese Patent Application No. 201780085722.3, dated Jan. 5, 2021.

(Continued)

*Primary Examiner* — Lisa M Caputo
*Assistant Examiner* — Rose M Miller
(74) *Attorney, Agent, or Firm* — Andrus Intellectual Property Law, LLP

(57) ABSTRACT

An actuator comprising a linear electrical machine (LEM) having a stator with a stator bore and a translator axially movable within the stator bore and defining a magnetic circuit airgap therebetween, at least one fluid bearing journal formed on the translator, at least one fluid bearing providing a bearing gap adjacent the translator to allow the translator to move axially within the stator bore, a preload chamber for applying a preload force to the translator, wherein the preload chamber is defined by a side wall, a first end wall and a second end wall at least part of which is movable with the translator, and wherein the bearing gap and the magnetic circuit airgap are coaxial.

17 Claims, 17 Drawing Sheets

Enlarged partial view of
Section A - A

(51) Int. Cl.
    *H02K 7/08*      (2006.01)
    *G01M 7/02*      (2006.01)
    *G01M 7/04*      (2006.01)
    *H02K 5/167*     (2006.01)
    *G01M 17/007*    (2006.01)

(52) U.S. Cl.
    CPC .............. *G01M 7/022* (2013.01); *G01M 7/04* (2013.01); *H02K 5/1672* (2013.01); *H02K 7/08* (2013.01); *H02K 11/215* (2016.01); *F16C 32/0603* (2013.01); *F16C 32/0607* (2013.01); *F16C 32/0629* (2013.01); *F16C 32/0633* (2013.01)

(58) Field of Classification Search
    CPC . G01M 17/0074; F16C 32/06; F16C 32/0603; F16C 32/0607; F16C 32/0629; F16C 32/0633
    USPC .......................................................... 73/669
    See application file for complete search history.

(56) References Cited

U.S. PATENT DOCUMENTS

| | | | |
|---|---|---|---|
| 5,600,189 A | 2/1997 | Van Geel et al. | |
| 5,668,421 A * | 9/1997 | Gladish | F16C 32/06 |
| | | | 310/12.11 |
| 5,777,403 A | 7/1998 | Yuan | |
| 7,401,520 B2 | 7/2008 | Parison et al. | |
| 2004/0099784 A1 | 5/2004 | Kienholz | |
| 2010/0071583 A1 * | 3/2010 | Ro | F16C 29/025 |
| | | | 104/284 |

OTHER PUBLICATIONS

International Search Report and Written Opinion in corresponding International Application No. PCT/GB2017/053858, dated Mar. 19, 2018.

* cited by examiner

Section A - A

Section B - B

Section C - C

Section D – D

Section D – D

Section D – D

Section D – D

Section E – E

Section E – E

Section D – D

Section D – D

Enlarged partial view of
Section A - A

Enlarged partial view of
Section A - A

HYDRO-MAGNETIC LINEAR ACTUATOR

CROSS-REFERENCE TO RELATED APPLICATIONS

This application is the U.S. national stage application of International Application PCT/GB2017/053858, filed Dec. 21, 2017, which international application was published on Aug. 9, 2018, as International Publication WO2018/142096 in the English language. The international application is incorporated herein by reference, in entirety. The international application claims priority to GB Patent Application No. 1701952.2, filed Feb. 6, 2017, which is incorporated herein by reference, in entirety.

This invention relates to an actuator and, in particular, an actuator including a linear electrical machine (LEM).

Such actuators can be used in various applications including, but not limited to, displacement and vibration test systems, manufacturing operations and robotics. In displacement and vibration test system applications, the actuator may be used to apply a cyclic force or motion profile to a test subject. The test subject could be a material sample, a discrete component, a sub-system assembly of components or a complete product. The purpose of such testing may be to determine the durability of the test subject to the applied force or displacement function. Alternatively, testing may seek to characterise the response of the test subject to the applied force or displacement function.

The automotive industry makes widespread use of such test actuators for sub-assembly testing and complete product testing. The test actuator is typically arranged to support a vehicle or part of a vehicle such as one of more wheels or suspension parts.

In particular, in a vehicle testing application, the invention may be utilised as part of a road simulator vehicle test system in which each corner of a vehicle is typically supported on a separate actuator. The support may be provided directly to the wheels of the vehicle or may be provided to other components such as a suspension part, a stub axle or supporting arms. Actuators could be applied to the body of the vehicle in certain situations. Motion of the actuators can then simulate movement of the vehicle over various road surfaces and other terrain. The testing environment is therefore a controlled one in which force or displacement input functions representing different driving speeds and road surface conditions can be applied to the vehicle. As examples, by varying the amplitude of a high frequency displacement, rougher or smoother road surface can be simulated. Alternatively, extreme loads can be applied to simulate pot holes and other larger features in the road. Such testing can be used in vehicle development to reduce driving noise and ensure the vehicle suspension components are sufficiently capable and durable for the intended range of driving conditions.

In order to simulate the high frequency displacements that characterise road loads at representative driving speeds, servo-hydraulic systems are commonly used as a basis for automotive test systems. In these systems, a servo-hydraulic power pack generates high pressure hydraulic fluid which is then fed to hydraulic actuators using one or more servo-valves. These systems suffer from a number of well-known drawbacks.

Firstly, the inertia of the hydraulic oil and servo-hydraulic power pack components limits the practical frequency of road load functions that can be generated to approximately 150 Hz. This is far below the level of performance necessary to accurately represent road surface roughness which is characterised by features at the scale of 20 mm and less, and is also below the input vibration frequencies known to excite resonances in the structure of the vehicles which in turn produce undesirable cabin noise.

Secondly, servo-hydraulic systems require expensive and dedicated infrastructure within the test facility which can be extremely bulky, and yet which must be located relatively close to the hydraulic actuators to limit the inertia of oil moving within the system. In addition, this infrastructure requires specialist operation and maintenance expertise.

Thirdly, servo-hydraulic systems are large consumers of power, making them expensive to operate and contributing to the carbon emissions footprint of automotive development and manufacture.

Fourthly, servo-hydraulic systems can be extremely noisy, making it difficult to differentiate between noise produced due to the response of the test subject and the associated noise of the test actuator system itself.

As a result of these drawbacks, linear electromagnetic actuators are being adopted in place of servo-hydraulic systems for certain automotive testing applications and other test actuator applications. Linear electromagnetic actuators have the advantages of being more responsive, more compact, easier to operate and maintain, more efficient and less noisy.

In several such systems, a spring and/or pneumatic cylinder are provided to enable the actuators described in prior art to apply a static load through or alongside the electrical machine translator and into the test subject. This arrangement permits the actuator's fixed force component to be adjusted prior to operation in order to balance the test subject weight and/or to ensure the test subject is in the correct position prior to the start of testing.

U.S. Pat. No. 7,401,520 teaches a complete system for testing a vehicle comprising a plurality of apparatus, each of the plurality of apparatus comprising a frame for supporting at least a portion of a wheel of a vehicle and a linear electromagnetic actuator at least partially contained within the frame, the linear electromagnetic actuator having a movable magnet and in use imparting a controlled substantially vertical force to a vehicle wheel. Each of the apparatus is arranged to independently impart controlled substantially vertical force on a corresponding one of a plurality of supported vehicle wheels and a plurality of air springs (which are sometimes referred to as airbags) or alternatively mechanical springs (from the group comprising a coil spring, a torsional spring and a leaf spring) are provided to provide levelling of a supported vehicle.

Such a system suffers from a number of drawbacks.

Firstly, the requirement for a load-bearing mechanical connection between the airbag or mechanical spring and the wheel plate or electrical machine mover adds inertial mass to the moving assembly. This additional inertia reduces the peak frequencies that the actuator is capable of achieving for a given displacement.

Secondly, the use of a compliant member such as an airbag or mechanical spring introduces the possibility of undesirable resonances being generated in the test actuator system, compromising the integrity of the input function that is applied to the test subject.

Thirdly, the arrangement taught by U.S. Pat. No. 7,401,520 requires an unnecessary level of complexity in construction due to the need to couple discrete spring and electrical machine assemblies within each actuator test frame, resulting in increased cost and size of the overall device.

U.S. Pat. No. 8,844,345 teaches an apparatus that imparts motion to a test object such as a motor vehicle in a controlled fashion. A base has mounted on it a linear electromagnetic motor having a first end and a second end, the first end being connected to the base. A pneumatic cylinder and piston combination have a first end and a second end, the first end connected to the base so that the pneumatic cylinder and piston combination is generally parallel with the linear electromagnetic motor. The second ends of the linear electromagnetic motor and pneumatic cylinder and piston combination being commonly linked to a movable member which is additionally attached to a mount for the test object. A control system for the linear electromagnetic motor and pneumatic cylinder and piston combination drives the pneumatic cylinder and piston combination to support a substantial static load of the test object and the linear electromagnetic motor to impart controlled motion to the test object.

Such a system suffers from a number of drawbacks similar to those previously described in relation to U.S. Pat. No. 7,401,520.

Firstly, the requirement for a discrete pneumatic cylinder and piston combination, a load bearing movable member and mount for a test subject adds considerable inertial mass to the moving assembly. This additional inertia reduces the peak frequencies that the actuator is capable of achieving for a given displacement.

Secondly, the use of pneumatic cylinder and piston combination, rather than an airbag or mechanical spring, introduce friction due to sliding seal between the pneumatic cylinder and piston. This friction will affect the net force that is applied to the test subject, and may also result in wear and reduced life of the actuator.

Thirdly, the arrangement taught by U.S. Pat. No. 8,844,345 requires an unnecessary level of complexity in construction due to the need to couple an electrical machine, pneumatic cylinder, movable member and mount for a test subject within each actuator test frame, resulting in increased cost and size of the overall device.

The present invention aims to address one or more of the problems identified above.

According to the present invention, there is provided an actuator comprising: a linear electrical machine (LEM) having a stator with a stator bore and a translator that is axially movable within the stator bore and defining a magnetic circuit airgap therebetween; at least one fluid bearing journal formed on the translator; at least one fluid bearing providing a bearing gap adjacent the translator to allow the translator to move axially within the stator bore; a preload chamber for applying a preload force to the translator; wherein the preload chamber is defined by a side wall, a first end wall and a second end wall at least part of which is movable with the translator, and wherein the bearing gap and the magnetic circuit airgap are coaxial. The preload chamber is preferably coaxial with the stator bore and bearing gap.

The fluid bearing could be a gas bearing, which would typically be suitable for applications where the preload chamber contains a gas. Alternatively, the fluid bearing could be a hydrodynamic or hydrostatic bearing, which would typically be suitable for applications where the preload chamber contains a liquid. Where the specification refers to the use of a fluid bearing this should be taken to mean any of a gas bearing, a hydrodynamic bearing and a hydrostatic bearing.

The at least one fluid bearing preferably defines a coaxial (and therefore concentric) location of the translator and stator and the exterior magnetic circuit airgap therebetween. This arrangement therefore permits the incorporation of a low friction fluid bearing function to precisely locate the translator relative to the central core whilst keeping the translator's moving mass to a minimum.

In one possible embodiment at least one of the fluid bearings is preferably mounted on a central core and runs on a bearing surface formed on a part of the interior of a hollow translator. The fluid bearing is typically a separate component providing a flow of gas or liquid bearing fluid from a supply and into the bearing gap. By virtue of this arrangement there is no requirement for additional translator length beyond the lower end of the stator in order to remain engaged with an external fluid bearing beneath the stator, and the mass of the translator is thereby substantially reduced for the same electromagnetic force. In addition to providing coaxial (and therefore concentric) location of the translator and central core, the fluid bearing also provides a reaction force to oppose any side loads that are generated by the linear electrical machine stator. The provision of a fluid bearing on the central core and within the upper and lower ends of the electrical machine stator reduces the length of the side load force transmission path between the stator and the fluid bearing. Side load force transmission by the translator to the bearing positions may result beam bending between bearings or cantilever bending to either side of a single bearing. Such bending may result in non-concentric location between the translator and the central core and, by extension, non-concentric location between the translator and the stator, and is therefore undesirable. The arrangement of the present invention therefore reduces the requirement for additional translator mass to provide sufficient translator stiffness to limit translator bending under the action of electrical machine stator side loads. The present invention therefore is able to maintain the coaxial (and therefore concentric) relationship between the linear electrical machine stator and the translator with a greater electrical machine force per unit of moving mass than for alternative arrangements.

Locating the fluid bearing on the fixed central core rather than on the translator avoids the additional mass of this component contributing to the translator's moving mass. The bearing journal surface may be formed on the structure of the hollow translator and does not require the addition of a separate component to the translator. This arrangement therefore permits the incorporation of a fluid bearing function to transmit side loads generated by the electrical machine stator into the central core whilst keeping the translator's moving mass to a minimum.

By virtue of this arrangement the present invention permits close integration of the preload chamber within the construction of the actuator and helps reduce the overall size of the machine. The preload chamber contains fluid supplied at an elevated pressure and which applies a net force on the translator. This helps balance the test subject weight and/or to ensure the test subject is in the correct position prior to testing starting. This close integration also eliminates the need for a separate mechanical element to provide a load path between the preload chamber and translator so that the moving mass is reduced.

The use of rigid wall elements to form the preload chamber also avoids the use of compliant materials such as those used in an airbag or mechanical spring. This reduces the impact of actuator system resonances that might otherwise affect the input function that is applied to a test subject.

This arrangement also provides an actuator which is compact in size, especially in its width.

The provision of at least one fluid bearing provides a very low friction interface between the translator and the stator.

This arrangement offers lower mechanical friction and wear than is typically found with sliding contact bearings, and offers this benefit without the reciprocating mass penalty of rolling element bearings. This arrangement therefore allows higher frequency operation due to the low inertia of the system. In addition, the fluid bearings can form part of an effective non-contact pressure seal to retain pressure in the preload chamber without the friction associated with contact seals.

The invention refers to a magnetic circuit airgap. For the purpose of the invention, this term refers to a gap in which the relative permeability is close to that of air. The gap may or may not contain air or another gas. Such usage is well known in the field of electrical machines.

One or more bearing journals may be provided and at least one journal is preferably provided on the outer surface of the translator.

The preload chamber may act like a spring, in which the chamber has a non-zero spring rate, such that the preload force changes as the translator moves. In an alternative arrangement, the chamber can be arranged such that it has a zero-spring rate. The preload chamber may be provided with at least one conduit for regulating the pressure within the chamber. Such a conduit allows the pressure within the preload chamber to be regulated to a constant value, thereby providing a zero-spring rate arrangement.

The electrical machine may be of a moving magnet type in which magnets are fixed to the movable translator. One embodiment uses a sub-type of moving magnet machine commonly known as a slotted machine in which the flux circuits are carried by magnetically permeable materials and the magnetic flux is cut by current flowing in copper coils set into slots within this material. An alternative sub-type of moving magnet machine is commonly known as a slotless machine, which offers higher peak force and lower cogging force, but lower efficiency than slotted machine types. Alternative embodiments may use other established linear electrical machine types including flux switching and switched reluctance machines.

The movement of the movable part of the end wall is preferably coaxial with the stator bore which helps to minimise the width of the actuator. The magnetic circuit airgap is preferably cylindrical.

A test subject mounting point is preferably fixed to the translator, normally at its upper end.

The fluid bearing preferably acts upon a fluid bearing journal on the outer surface of the translator. Alternatively or additionally, the fluid bearing acts upon a fluid bearing journal on the inner surface of the translator, especially when the translator is hollow and slides axially along a central core.

The actuator may further comprise an encoder connected to the translator which typically senses one or more of position or velocity. The encoder may use at least one optical, magnetic or mechanical sensor. The encoder assists is controlling the actuator by determining the position and/or speed of the translator.

At least one bearing gap may include a plurality of axial extending arcuate cross section channels arranged around the translator. The bearing gap may be either cylindrical or include two or more arcuate sections.

The actuator may include an actuator housing body housing the LEM, the housing body containing one or more cooling channels.

One example of the present invention will now be described with reference to the accompanying drawings, in which:

FIG. 1 is an external view a first actuator 10 having a motion axis 20 along which a translator (shown later) moves and the locations of various planes for further sectional views.

Figure 2:
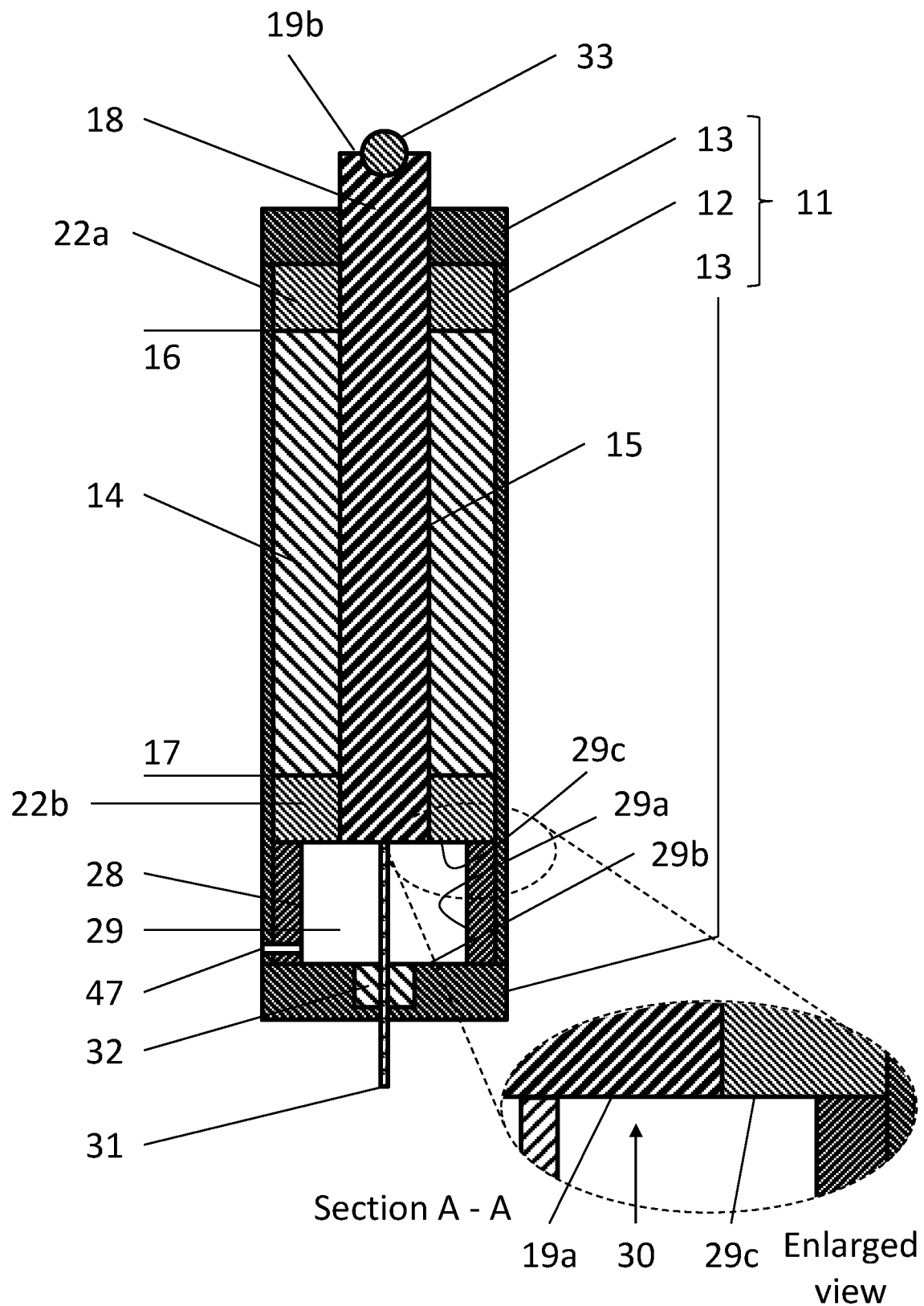
FIG. 2 is an axial section AA through the actuator of FIG. 1 at the top of the stroke.

FIG. 2 shows the actuator 10 having a housing body 11. The housing body 11 is formed from a typically cylindrical wall 12 and by end walls 13 defining a hollow interior. The interior holds a stator 14, typically a tubular linear electrical machine stator, which has a cylindrical bore 15 extending axially from one end 16 of the stator to the other end 17. A translator 18 is axially movable relative to the stator 14. An exterior magnetic circuit airgap 21 (see FIG. 5) exists between the translator and stator. In this example embodiment, the housing and therefore the stator are rigidly held and the translator 18 moves within the stator 14.

A pair of fluid bearings 22a and 22b are provided—in the figure, the upper bearing 22a defines one end of the actuator 10 and is adjacent end 16 of the stator 14, whilst the lower bearing 22b is adjacent the other end 17 of the stator 14. The bearings 22a, 22b and the stator 14 form a static assembly 50 within which the translator can move. On the other side of the lower fluid bearing 22b is a chamber housing 28 which defines a preload chamber 29. In this example, the chamber housing is within the housing body 11 and retained by end wall 13. However, the chamber housing could form the end wall does not necessarily have to be within the housing body 11. An opening 30 into the preload chamber is closed by an end 19a of the translator 18. In this way, the sliding movement of the translator alters the volume of the preload chamber. The preload chamber is also provided with at least one conduit 47 through which a pressurised fluid can be supplied to provide the necessary force onto the translator. The chamber 29 contains a fluid which is typically a gas (although a liquid or two phase mixture is also possible) supplied at an elevated pressure and which applies a net force on the translator 18 in order to balance the test subject weight and/or to ensure the test subject is in the correct position prior to testing starting. The preload chamber is preferably adjacent (and by this we mean close to not necessarily directly in contact with) the static assembly. The purpose of this location is to minimise the additional length to the translator.

The sliding movement of the translator 18 within the cylindrical stator bore 15 changes the volume of preload chamber 29 and so creates the same effect as a piston moving within a cylinder. The working fluid in the preload chamber 29 is preferably a compressible gas, however this fluid could also be an incompressible liquid such as a hydraulic fluid which would be displaced through conduit 47 by the motion of the translator 18. This arrangement leads to improved test subject input signal quality when compared to airbag type preload force systems in which the translator motion and associated gas volume change is accommodated by the changing shape of a compliant element, whose compliance may result in unwanted system behaviour such as resonance or damping.

In any of the examples described, the preload chamber is formed by a side wall 29a, which may or may not be a cylindrical wall, a first end wall 29b typically formed by an inner surface of the end wall 13 or the housing 12 and which is fixed with respect to the side wall 29a, and a second end wall, part of which is movable with the translator 18. In the example embodiment shown in the enlarged view within FIG. 2, the second end wall is formed from a fixed end wall 29c and translator lower end 19a, which is movable with translator 18. By movable with the translator, we mean that the volume of the preload chamber is varied by movement of the translator. The first end wall 29b could also include a movable element which can vary the volume of the preload chamber together with the translator. Such a construction is less preferably due to the more complex control that would be required. The translator may, at either the top or bottom of the stroke, align with the rest of the second end wall 29c (see FIG. 2), extend into the chamber (see FIG. 3) such that the end wall includes not only the translator end 19a, but also part of the side wall of the translator, or be retracted relative to the rest of the second end wall 29c, i.e. such that the lower end 19a of the translator is higher (in the figures) than the rest of the second end wall 29c. Alternatively or additionally, a further wall element may be mounted on the translator, to act as the movable part of the second end wall—in this way, the translator itself may not form part of the preload chamber end wall, but a section of the wall is movable as the translator moves. The preload chamber may have a uniform cross section along the axis 20. The preload chamber may not be a fully closed volume, and in addition to conduit 47 other small gaps may exist between the translator and the fixed surfaces 29c or 29a. For the purposes of the definition of the preload chamber volume, any such gaps are considered as integral parts of surfaces 29a, 29b, 29c and 19a. One or more seals (see seal 46a in FIG. 16) may be provided in this, or any other of the examples, to prevent significant leakage of the pressurised fluid from the preload chamber through such gaps. Such seals could be one or more distinct seals, such as polymer gas seals, mounted on or in the stator and/or the bearing 22a, 22b. Alternative forms of sealing include the use of the structure of the stator and/or one or more of the gas bearings to define, together with the translator, a sufficiently narrow gap that only insignificant amounts of fluid can pass. In any example of suitable sealing, the seal acts with the journal surface 23 (see FIG. 5) to make the seal. In this way, the journal 23 acts both as a bearing journal surface and also as a sealing surface.

In the preferred embodiment, the lower end 19a of the translator is connected to an encoder scale 31 which passes through or near to an encoder body 32. In this example, the encoder is a position encoder and the encoder scale is a shaft, but the encoder scale could also be a flat surface and the encoder type could also be a speed/velocity encoder. The encoder body is located within the end wall 13, but may be located outside of the actuator 10 and provides information concerning the position and or speed/velocity of the translator to ensure the actuator can be controlled.

The upper end 19b of the translator 18 extends out of the upper end of the actuator 10 and is provided with a mounting point 33 for a test subject. The mounting point could be a flat plate or other surface onto which a test subject in balanced, e.g. the tyre of the wheel of a vehicle. Alternatively, the mounting point could include one or more fixing means for securely fastening the translator to a test subject. This may include one or more holes through the end of the translator.

Figure 3:
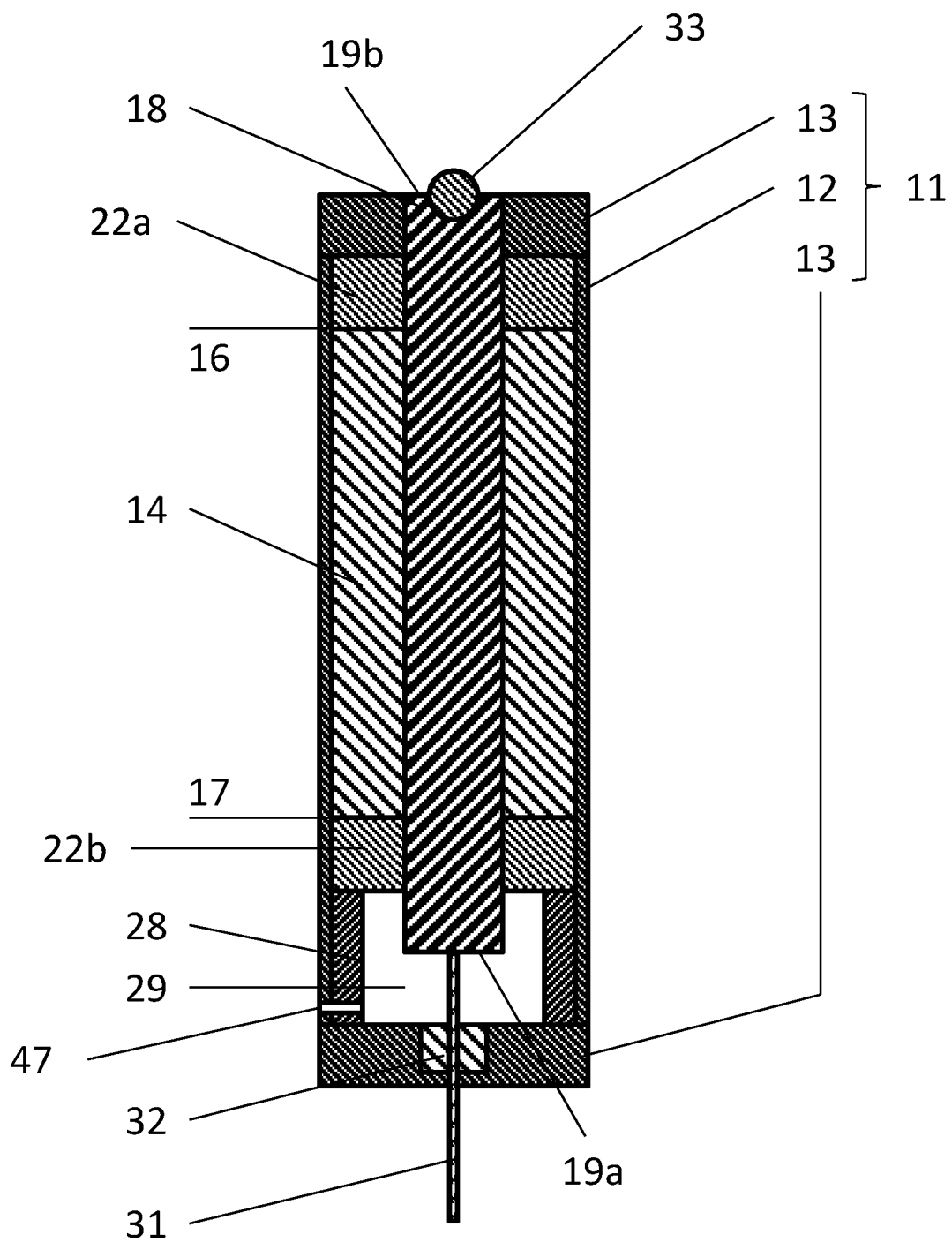
FIG. 3 is an axial section AA through the actuator at the bottom of the stroke.

FIG. 3 shows the translator 18 in a lower position, typically at the bottom of the stroke, in which the lower end 19a of the translator is now within the preload chamber 29 such that its volume has been reduced. The upper end 19b is now shown as being substantially level with the upper outside edge of the actuator, although in practice, the upper end 19b may still protrude depending upon the manner by which the test subject is connected to the mounting point.

The movement of the translator to a lower position is caused either (i) by the loading of the actuator by a test subject, in which case the translator is depressed until the load applied by the test subject is balanced by the preload chamber, or (ii) by application of an electric current to the stator causing movement to be induced in the translator. The pressure within the preload chamber is controlled by regulating the supply of the pressurised fluid through conduit 47 and this regulation can allow the chamber to provide a constant load to the translator, i.e. a zero-spring rate, or allow the chamber pressure and resulting load to vary as the translator moves, i.e. the chamber has a non-zero spring rate.

Figure 1:
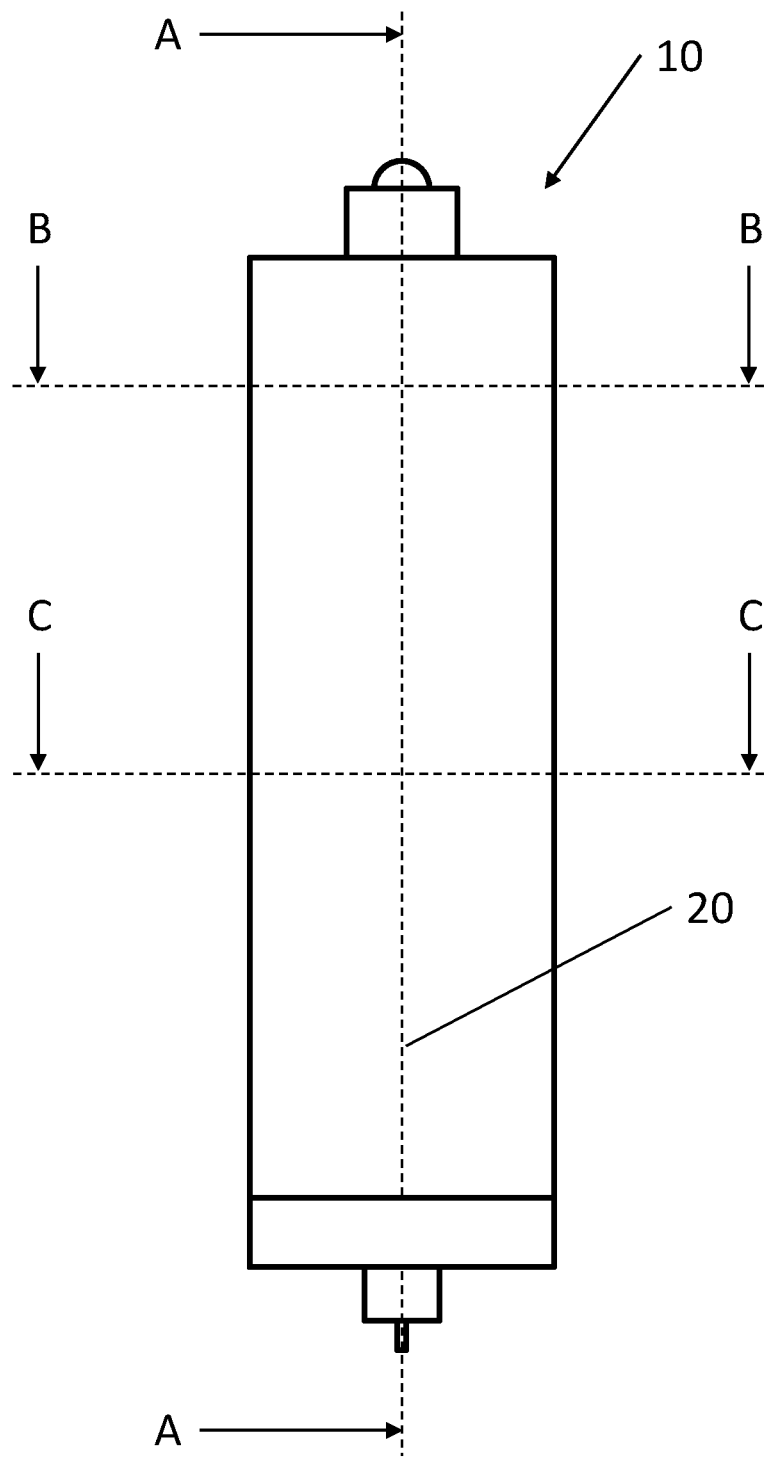
FIG. 1 is an actuator showing section planes AA, BB and CC.
Figure 4:
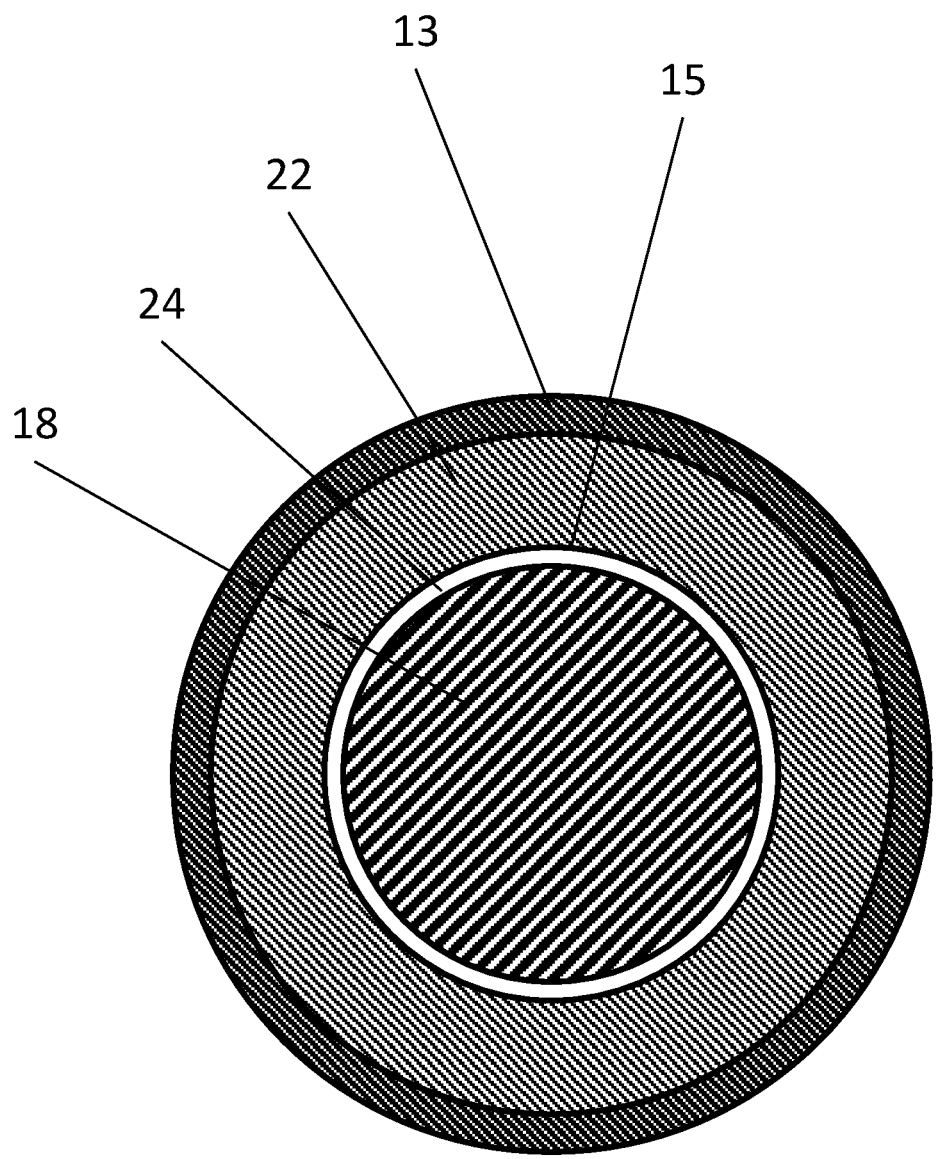
FIG. 4 is a perpendicular section BB through the actuator.

FIG. 4 is a perpendicular section along BB of FIG. 1 and shows the coaxial and concentric arrangement of the translator 18, the exterior bearing gap 24, the exterior fluid bearing 22 and the cylindrical wall 15 of the stator.

Figure 5:
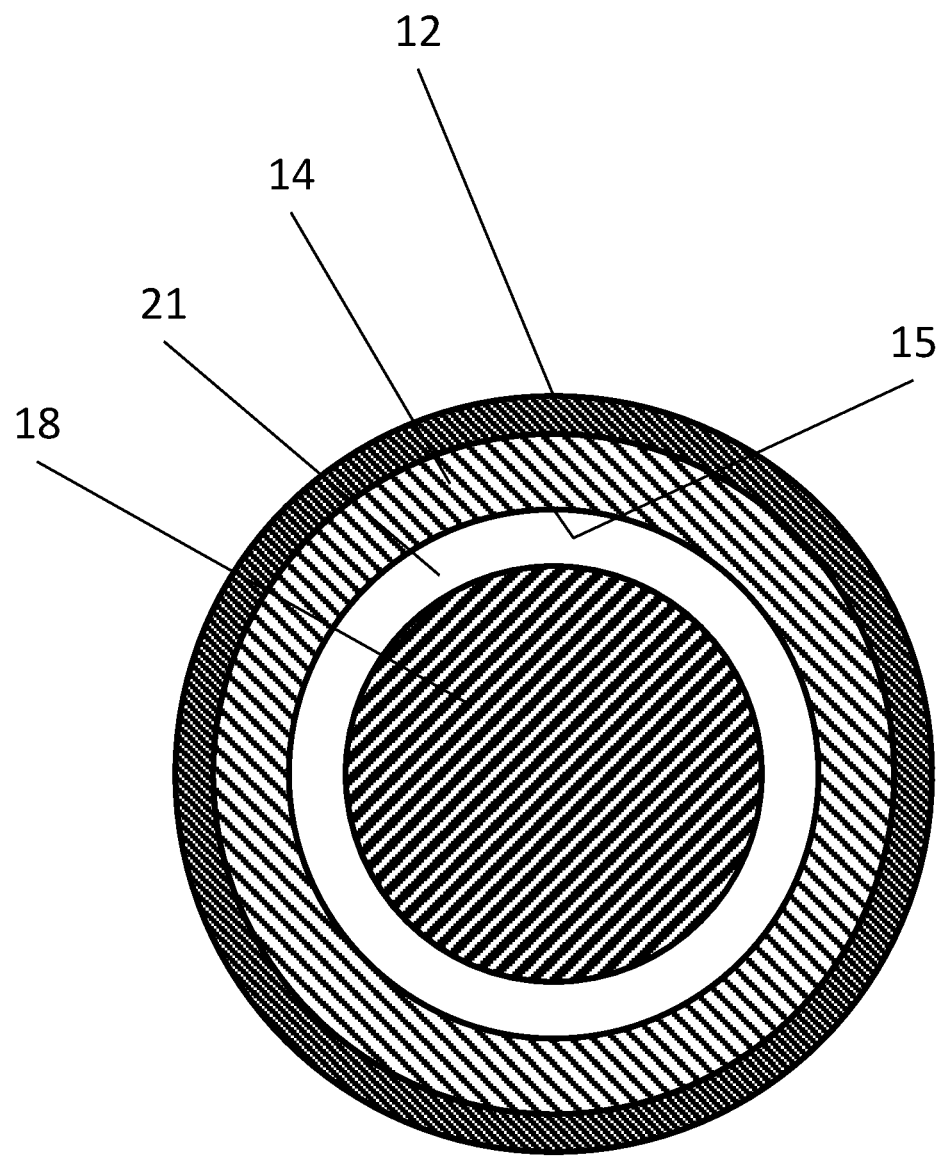
FIG. 5 is a perpendicular section CC through the actuator.

FIG. 5 is a perpendicular section CC of FIG. 1 showing the coaxial and concentric arrangement of the translator 18, the exterior magnetic circuit airgap 21, the stator 14 and the cylindrical wall 15. The translator is kept in the coaxial position by the fluid bearings 22a, 22b which define the bearing gap 24 between the inner surfaces of the fluid bearings 22a, 22b and one or more journals 23 on the exterior of the translator. The fluid bearings 22a, 22b are at each end of the stator, so the bearing gap 24 and the magnetic circuit airgap 21 are, in this arrangement, continuous. The relative sizes of the bearing gap 24 and the magnetic circuit airgap 21 are dependent upon the sizes of the translator, stator and fluid bearings. The bearing gap is typically smaller than the magnetic circuit airgap so that the magnetic circuit air gap thickness is effectively controlled by the high radial stiffness of the fluid bearing.

Figure 6:
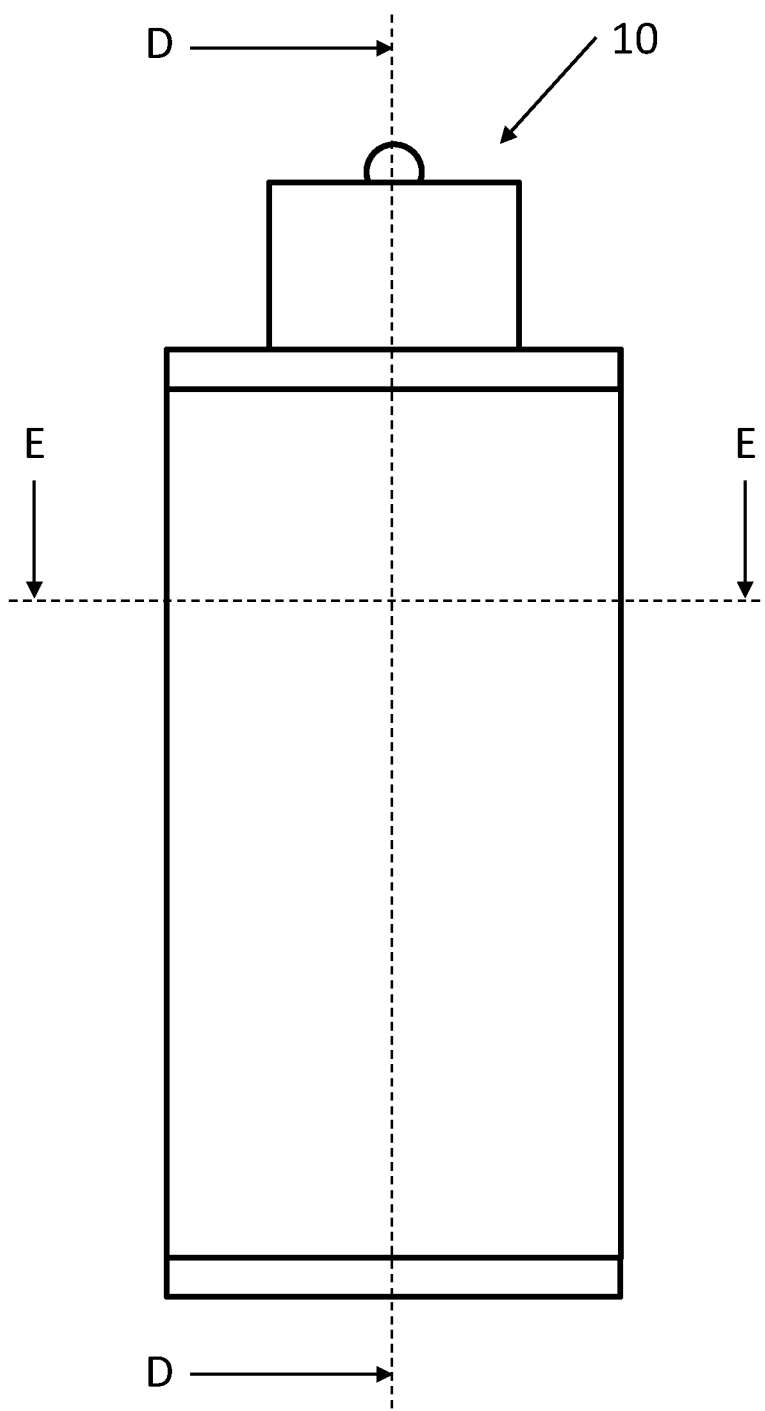
FIG. 6 is an external view of an alternate actuator showing section planes DD and EE.

FIG. 6 shows an external view of an alternative example of an actuator 10 and illustrates the position of sections DD and EE shown in subsequent Figures. In subsequent figures, the same reference numerals are used as in FIGS. 1 to 5 for the equivalent components.

Figure 7:
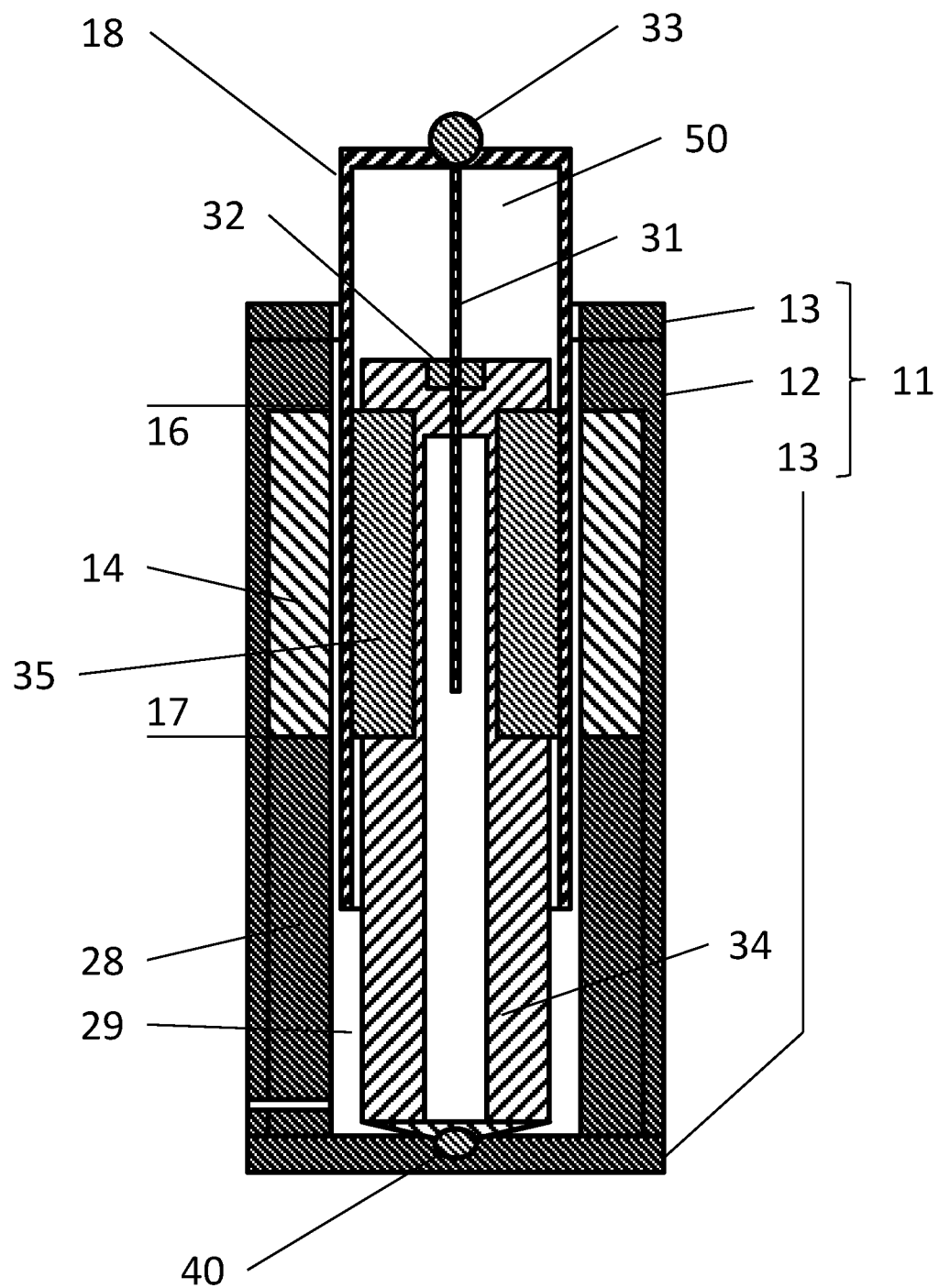
FIG. 7 is a perpendicular section DD showing a first alternative actuator with central core and interior fluid bearing.

FIG. 7 is a perpendicular section along DD showing a first alternative internal configuration having a central core 34. The central core is fixed at least axially relative to the stator 14 and in this arrangement is fixed at a central core fixing point 40 to the end wall 13. The upper end of the central core 34 is surrounded by a hollow translator 18, such that the translator slides over and outside the central core 34. A single elongate internal fluid bearing 35 is mounted on the central core and, in this example, no exterior fluid bearing is provided in the housing body 11. The fluid bearing is substantially the same length as the stator 14 so that any side loads generated by the electrical machine are matched by an opposing force applied by the fluid bearing in the same axial position. As a result of the use of a central core, the chamber housing 28 is larger relative to the stator 14, when compared to the example of FIGS. 1 to 5. This ensures that the volume of the preload chamber 29 can be set to provide the desired preload spring rate. The preload chamber is now defined not only by the chamber housing 28, end wall 13 and lower end of the translator 18, but also by the outer surface of the central core 34. The chamber 29 is therefore generally annular. Alternatively or additionally an equivalent preload chamber function may be performed by chamber 50 formed between the upper end of the central core 34 and the translator 18. One or more seals (see seal 46a in FIG. 16) may be provided in this, or any other of the examples, to prevent significant leakage of the pressurised fluid from the preload chamber along the translator into the magnetic airgap. Such seals could be one or more distinct seals, such as polymer gas seals, mounted on or in the stator and/or the bearing 22a, 22b. Alternative forms of sealing include the use of the structure of the stator and/or one or more of the gas bearings to define, together with the translator, a sufficiently narrow gap that only insignificant amounts of fluid can pass. In any example of suitable sealing, the seal acts with the journal surface 23 (see FIG. 5) to make the seal. In this way, the journal 23 acts both as a bearing journal surface and also as a sealing surface.

The translator 18 still has a test subject mounting point located at its upper end. In the example embodiment shown, the encoder body 32 is now located on the central core and allows the encoder scale 31, mounted on the inner part of the upper end of the hollow translator 18, to remain within the actuator.

Figure 8:
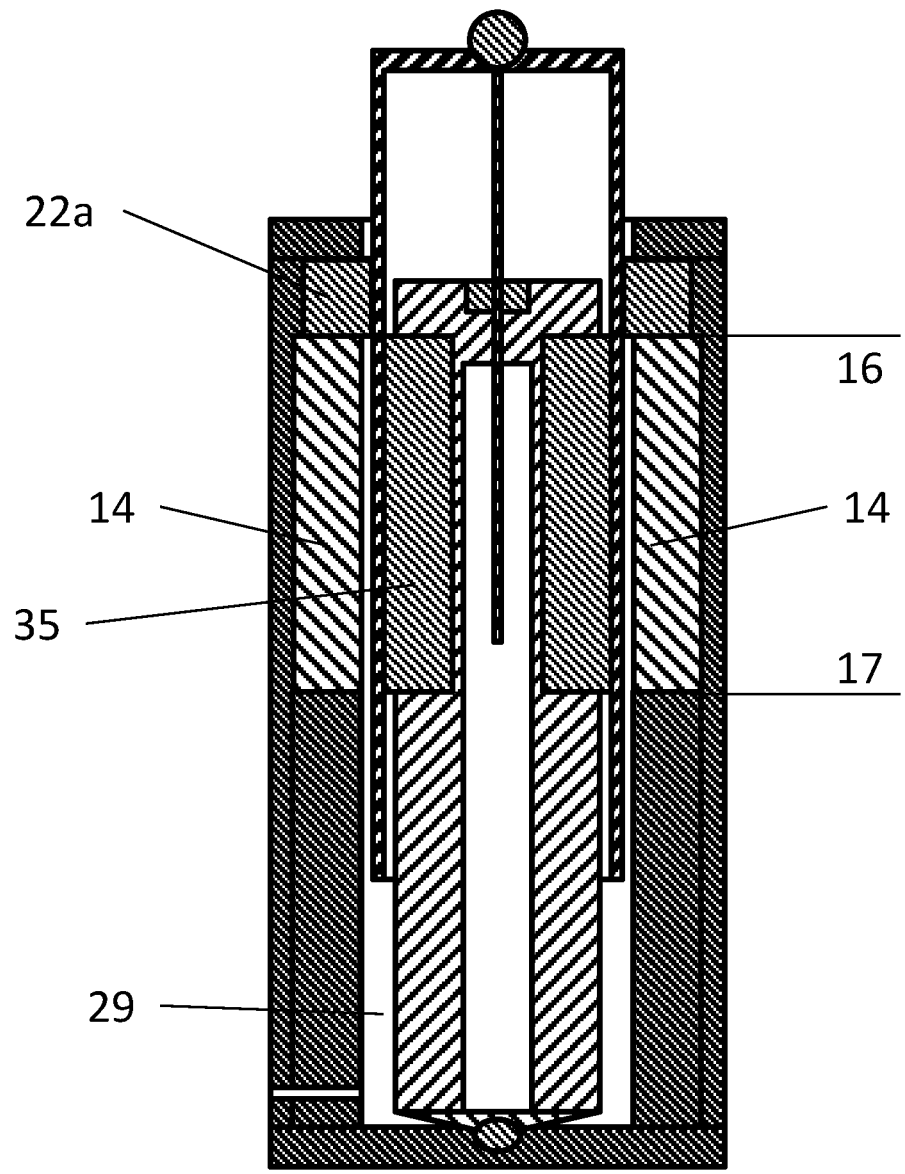
FIG. 8 is a perpendicular section DD showing a second alternative actuator with central core and interior and exterior fluid bearings.

FIG. 8 shows a second alternative configuration in which both an interior fluid bearing 35 and an exterior fluid bearing 22a are provided. Multiple exterior or interior fluid bearings could be provided if required.

Figure 9:
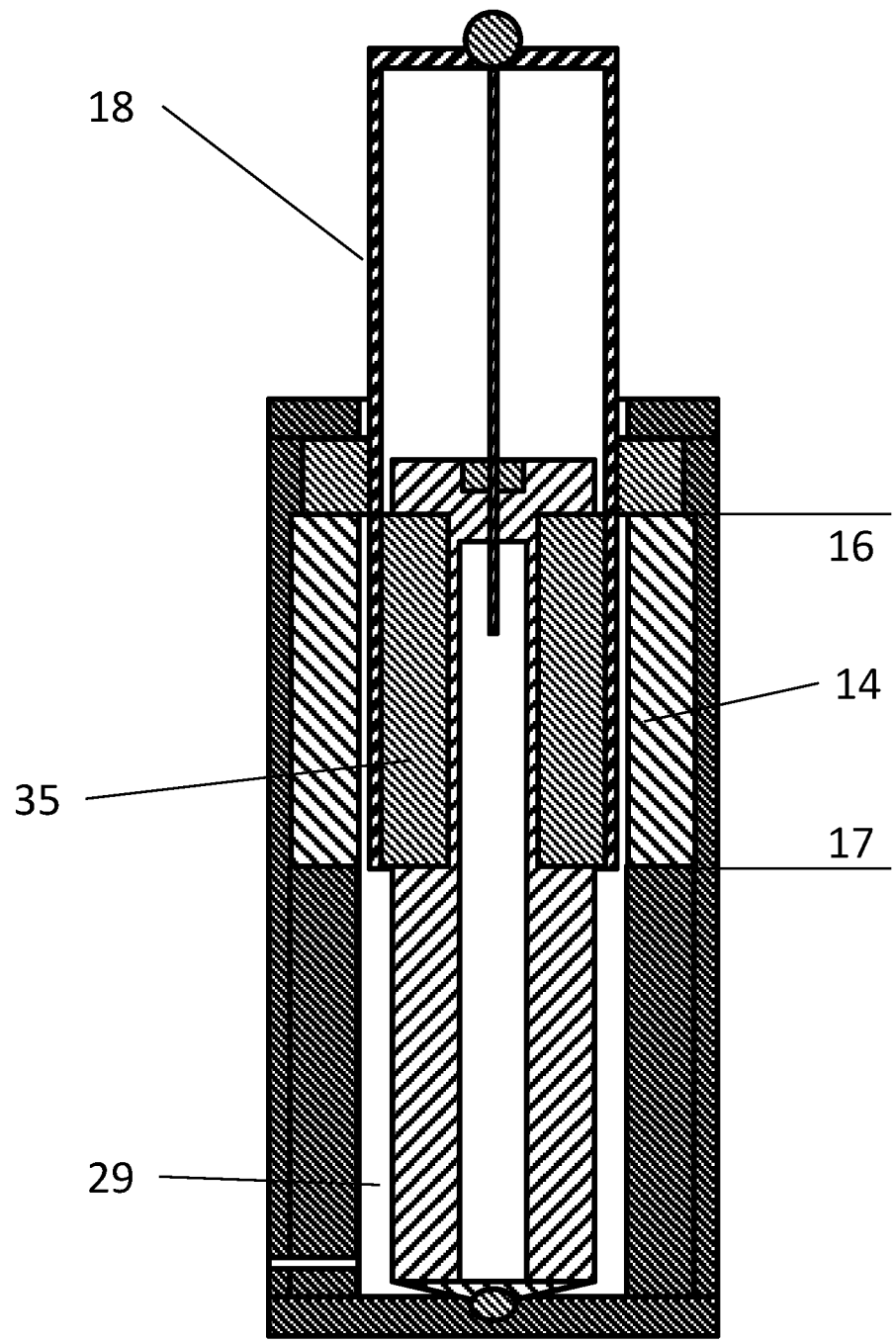
FIG. 9 is a perpendicular section DD showing the second alternative actuator with the translator at the top of the stroke.
Figure 10:
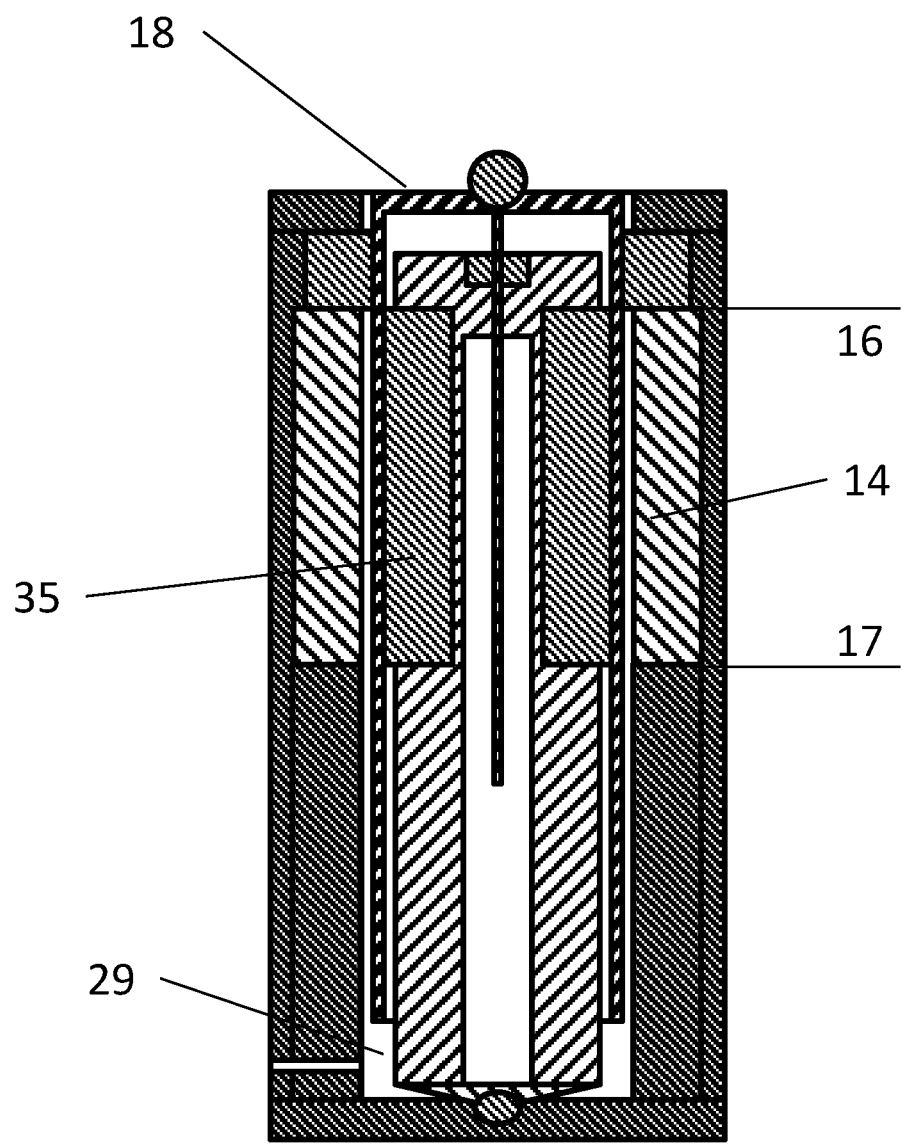
FIG. 10 is a perpendicular section DD showing the second alternative actuator with the translator at the bottom of the stroke.

FIGS. 9 and 10 illustrate the motion of the hollow translator 18 irrespective of the fluid bearing configuration, between the top of the stroke in FIG. 9 to the bottom of the stroke in FIG. 10. At the top of the stroke in FIG. 9, the lower end of the translator 18 is substantially adjacent the lower end of the stator 14, and in this position the volume of the preload chamber 29 is at its maximum. In this arrangement and as a result of the internal fluid bearing 35 there is no requirement for additional translator length beyond the lower end of the stator 17 in order to remain engaged with an external fluid bearing beneath the stator, and the mass of the translator is thereby substantially reduced for the same electromagnetic force. At the lower end of the stroke, the upper end of the translator 18 is substantially level with the upper outside edge of the actuator, although in practice, the upper end may still protrude depending upon the manner by which the test subject is connected to the mounting point.

Figure 11:
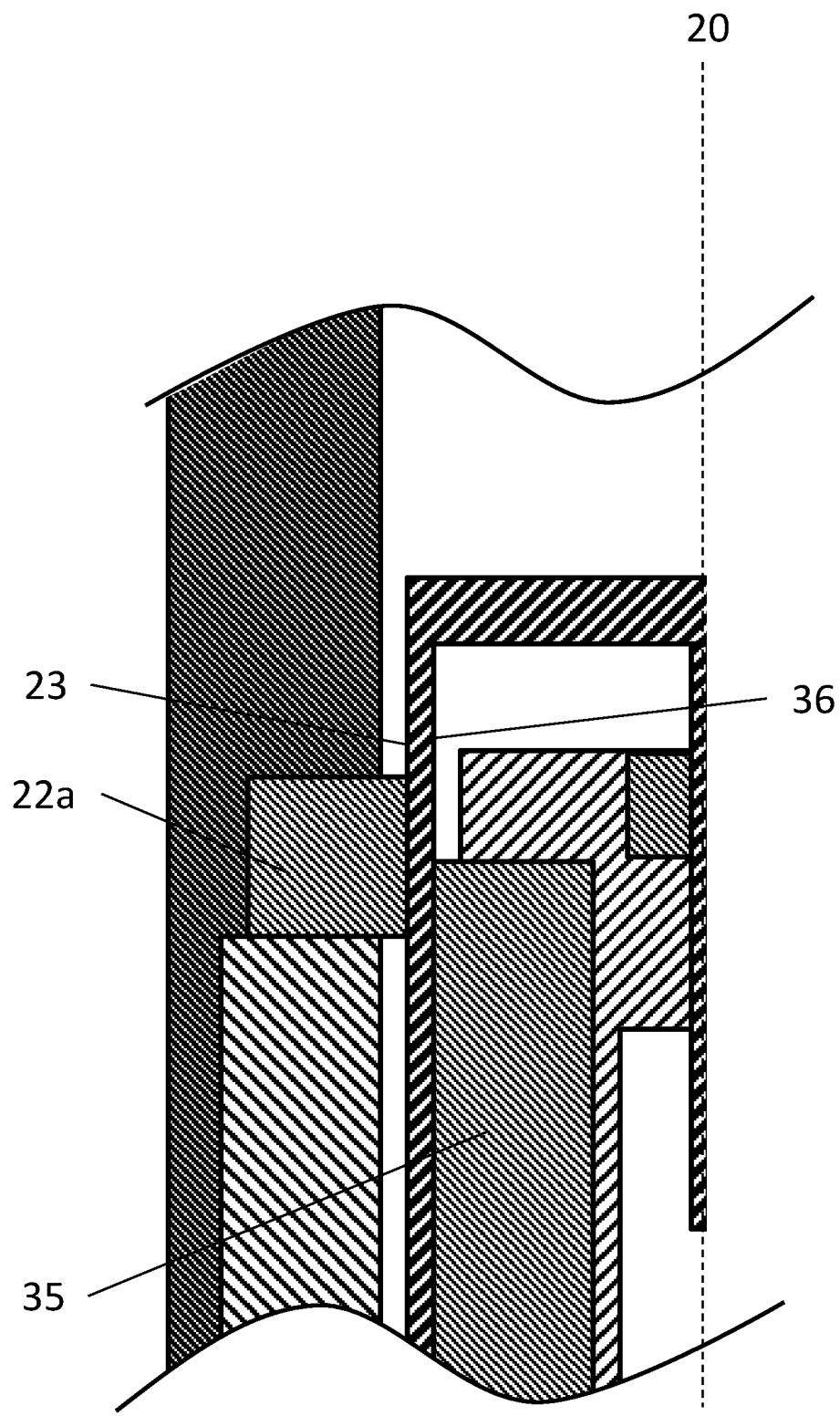
FIG. 11 is an enlarged view of perpendicular section DD showing the magnetic circuit airgap detail for the second alternative actuator.
Figure 12:
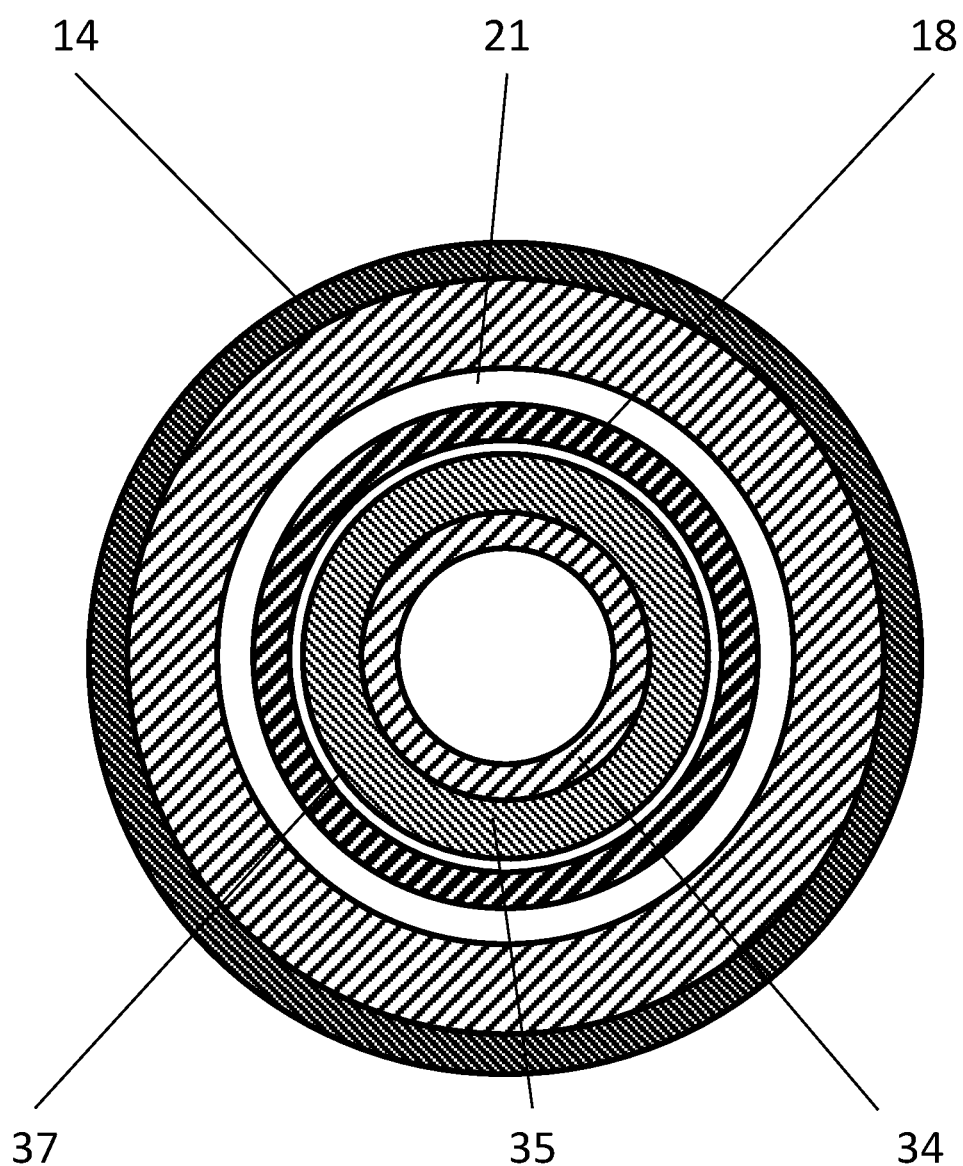
FIG. 12 is an axial section EE showing the second alternative actuator and the concentric magnetic circuit airgap and bearing gap.

Greater detail of the interior bearing gap 37 and magnetic circuit airgap 21 is shown in the views of FIGS. 11 and 12. FIG. 11 also illustrates the location of an exterior journal 23 on the translator. This is the surface onto which any external fluid bearing 22a acts. An internal journal surface 36 is also shown and is the surface onto which any internal fluid bearing 35a acts. The journal surfaces are typically machined onto the appropriate locations on the translator and would not typically be provided unless a corresponding fluid bearing was used.

Figure 13:
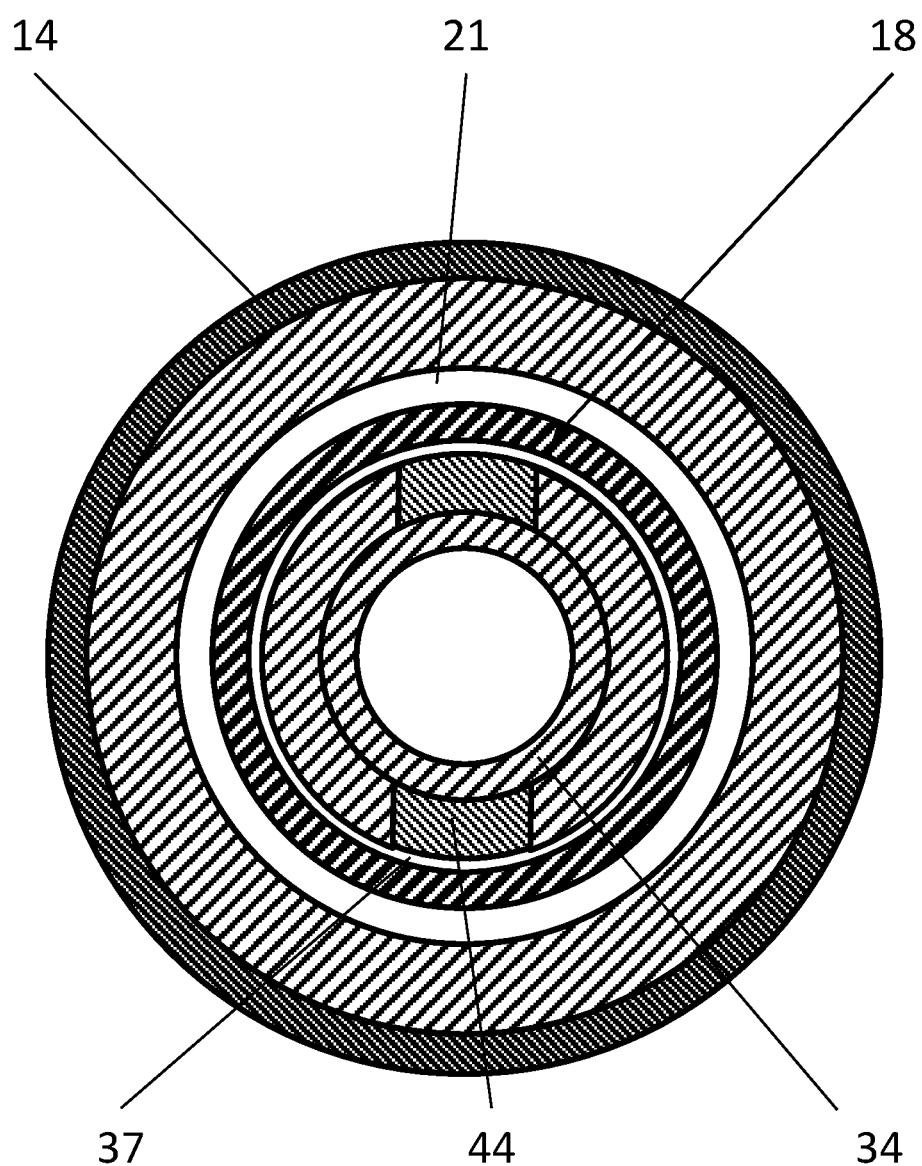
FIG. 13 is an axial section EE showing an alternative arrangement of internal fluid bearings.

Whilst the fluid bearings (internal or external) are generally annular elements having a porous structure through which gas is supplied under pressure to provide a load-bearing function at the bearing gap, any of the fluid bearings could take the form as shown in FIG. 13 in which the fluid bearing is formed from a plurality of fluid bearing shoes 44 spaced around (for exterior bearings) or inside (for interior bearings) the surface element on which the bearing acts. Whilst two bearing shoes are shown, three or four bearing shoes would be possible, and indeed a greater number would also be possible depending upon the size of the actuator and the loads which the bearing shoes experience. Importantly, the bearing shoes are preferably spaced equally so as to provide even loading onto the translator and maintain the coaxial positioning of the translator relative to the stator. The fluid bearings could be formed from a generally porous material such as carbon. Alternatively the fluid bearing porosity could also be provided through an array of discrete holes machined within one or more solid components.

Figure 14:
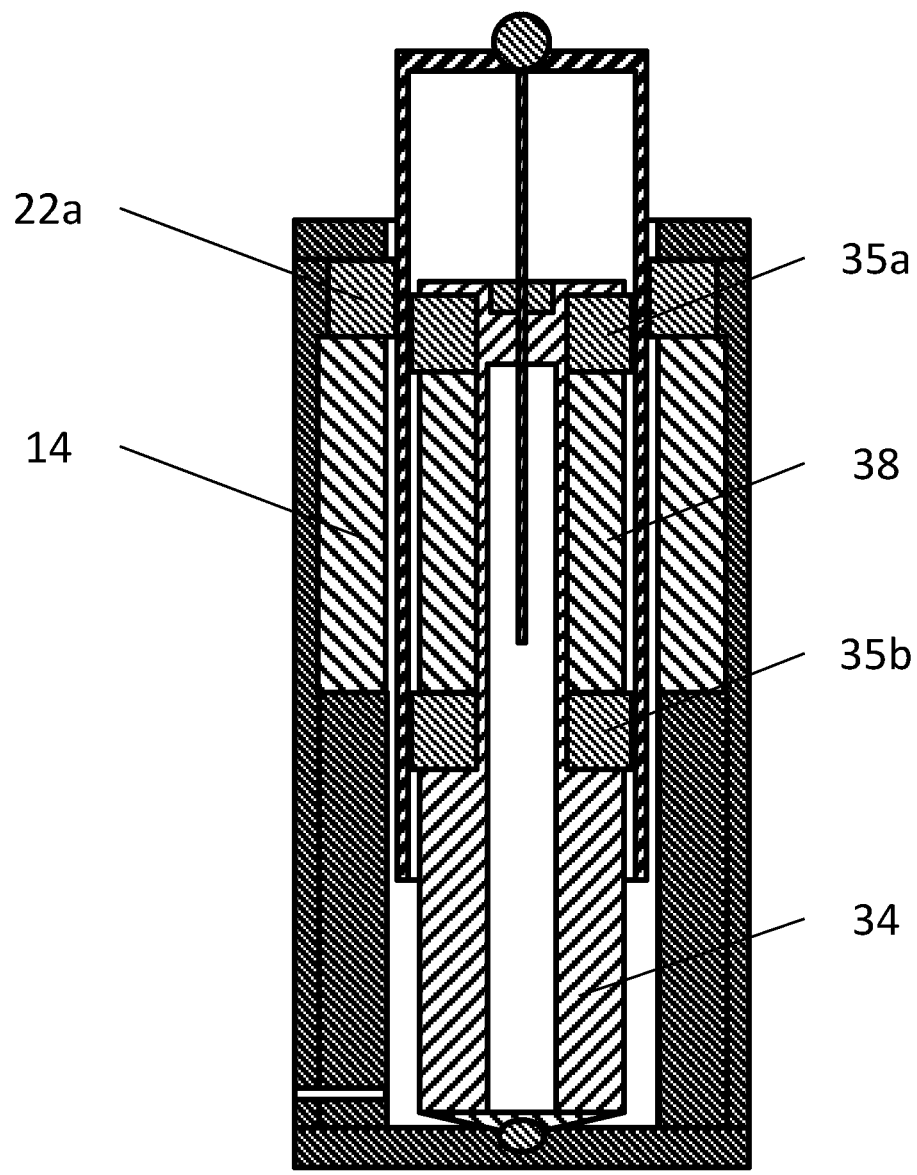
FIG. 14 is section DD showing a third alternative actuator with central core and interior stator.

FIG. 14 illustrates that the interior fluid bearing (either with or without exterior fluid bearings), could alternatively be formed by two or more fluid bearings. In this example, the interior fluid bearing is replaced by an upper interior fluid bearing 35a and a lower interior fluid bearing 35b.

The splitting of the interior fluid bearing permits the space between to be utilised, in this case by the inclusion of an interior stator 38 mounted on the central core 34 to provide a greater electrical machine force per unit of moving mass. This significantly increases the dynamic performance of the actuator. The interior stator 38 could be used in many different arrangements, for example with an upper interior fluid bearing and a lower exterior fluid bearing (or vice versa) and is not limited to the specific arrangement shown in FIG. 14.

Figure 15:
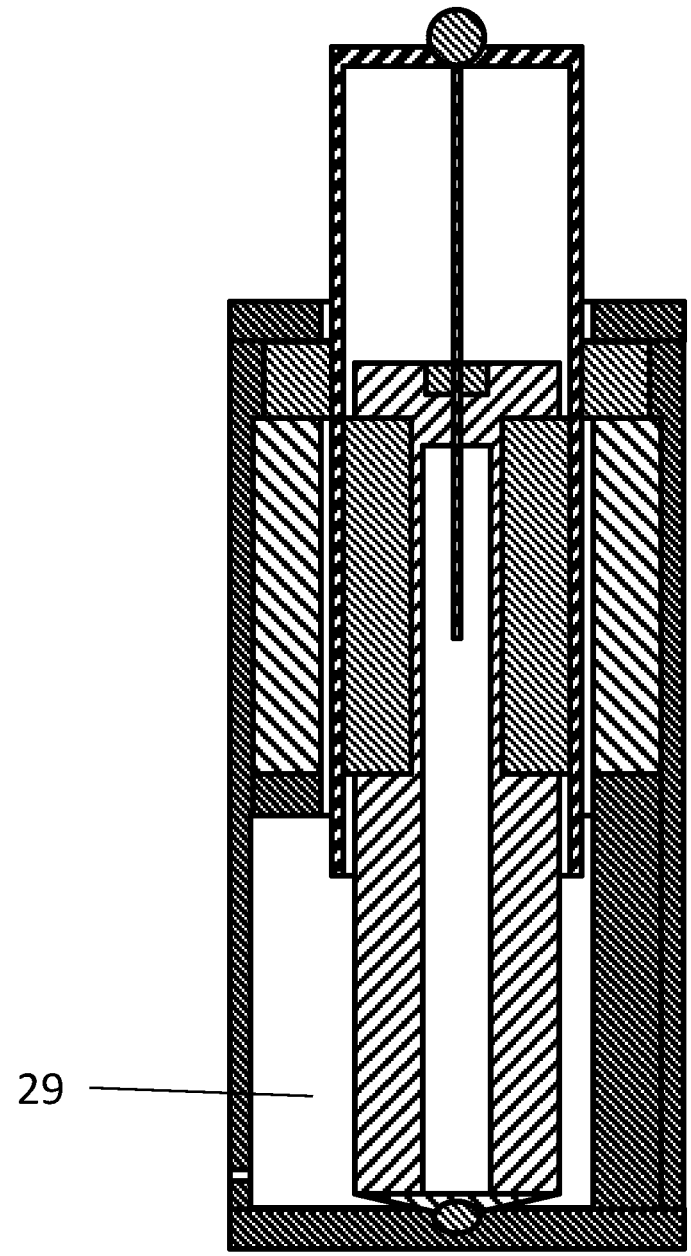
FIG. 15 is an axial section DD showing a further alternative arrangement with an asymmetric offset preload chamber.

FIG. 15 shows that the preload chamber 29 does not need to be a uniform shape, nor does the preload chamber itself need to be coaxial with the rest of the actuator. The asymmetric offset to the preload chamber could be utilised in any of the arrangements in previous figures and may result in the preload chamber having a non-uniform cross section and/or a non-cylindrical side wall.

Figure 16:
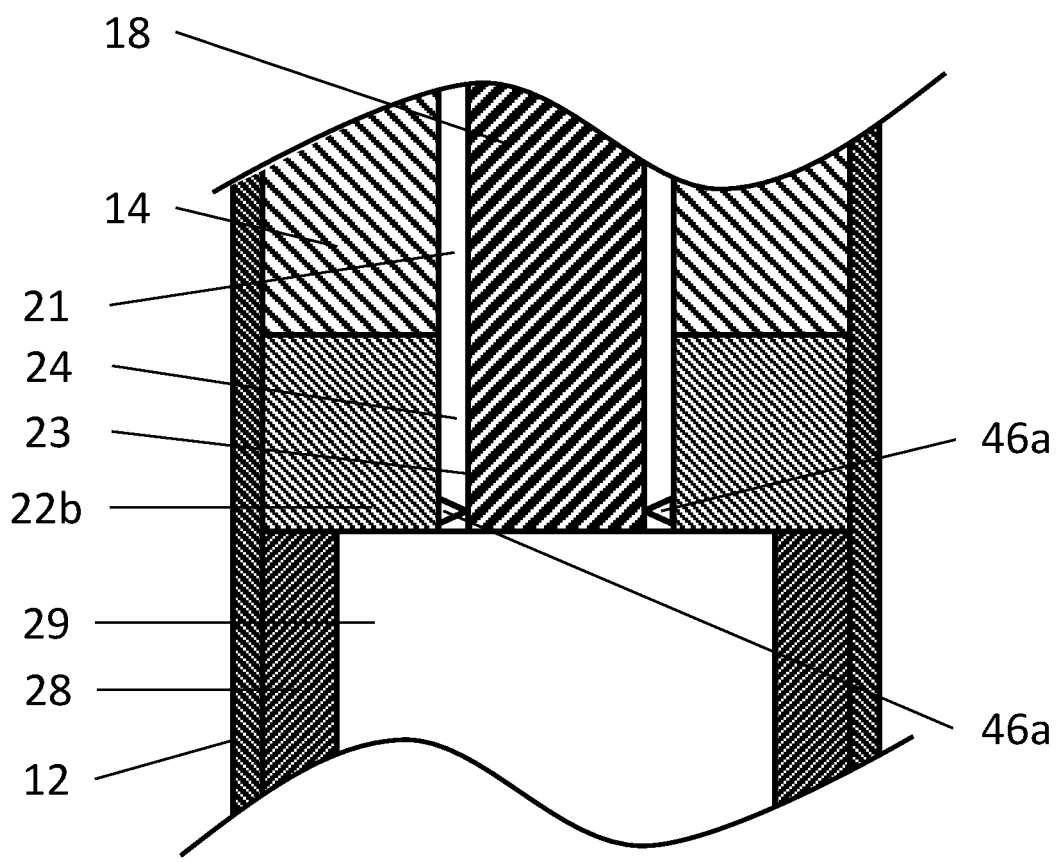
FIG. 16 is an axial cross section AA showing a seal between the bearing and the translator.

FIG. 16 shows a seal 46a for preventing unwanted fluid flow from the preload chamber 29 into the magnetic circuit airgap 21.

In FIG. 16, which shows a seal 46a in the arrangement of FIGS. 2 and 3, the seal is mounted on the inner surface of gas bearing 22b, such that the seal itself contacts the translator on the bearing journal surface 23. Thus, the bearing journal surface additionally acts as a sealing surface, and allows the translator length and therefore mass to be kept to a minimum. In an alternative arrangement not shown, the seal 46a could be located on the stator 14 itself above the gas bearing. The seal 46a would still act on the bearing journal surface on the translator, as long as the distance between the gas bearing 22b and the seal is not more than the stroke of the translator.

Figure 17:
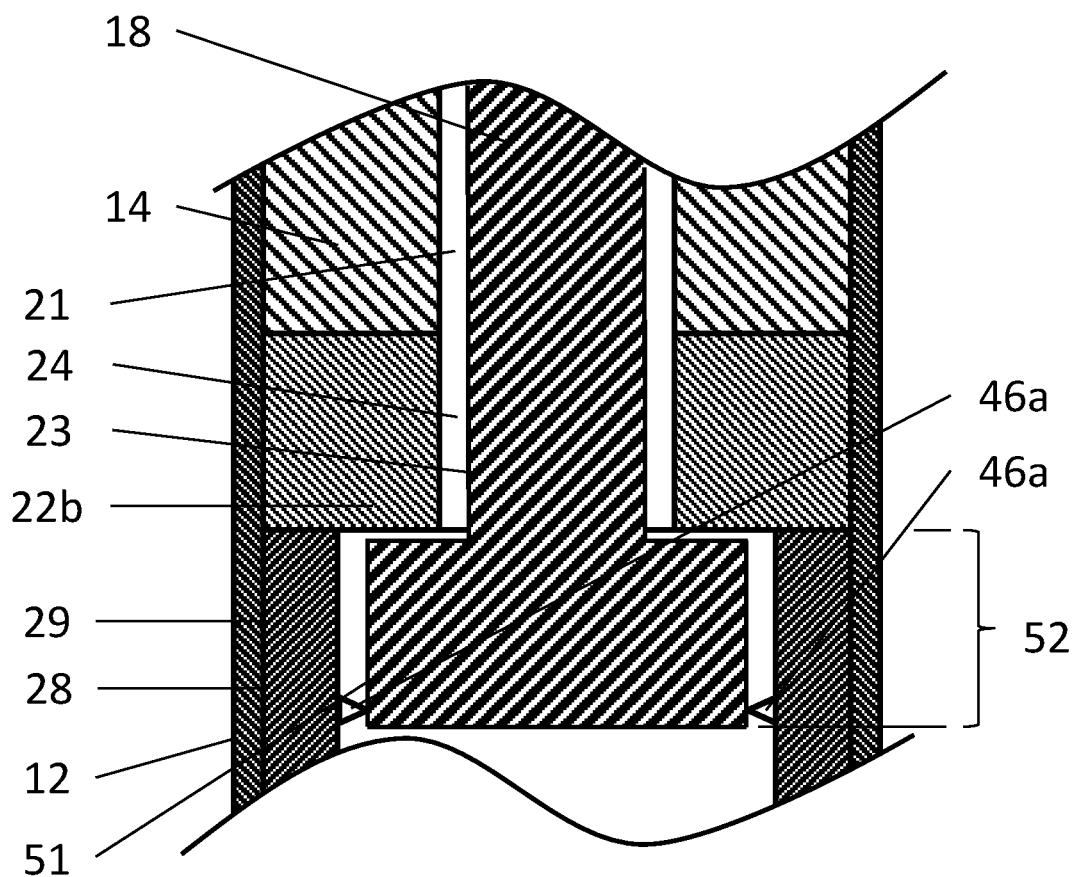
FIG. 17 shows another axial cross section AA showing a seal between the bearing and the translator, which is not part of the invention.

The advantage of the journal surface 23 on the translator acting both as a bearing surface and a sealing surface is apparent when considering the arrangement of FIG. 17, which is not part of the invention. In this arrangement, the seal 46a is located below the gas bearing, between the translator and the side wall of the preload chamber itself. This has necessitated a longer translator (it would need to be longer by at least the length of the stroke) and a wider translator to reach to walls of the preload chamber. This extra size to the translator results in very significant extra mass on the translator which adversely affects the response time of the translator to control inputs and also requires greater force to be applied in order to move the translator. Neither are desirably when seeing to provide highly responsive dynamic actuators.

The invention claimed is:

1. An actuator comprising:
   a linear electrical machine (LEM) having a stator with a stator bore and a translator axially movable within the stator bore and defining a cylindrical magnetic circuit airgap therebetween;
   at least one gas bearing journal formed on a surface of the translator;
   at least one gas bearing acting upon the at least one gas bearing journal and providing at least one bearing gap adjacent the translator to allow the translator to move axially within the stator bore, the gas bearing and the stator forming a static assembly;
   a preload chamber for applying a preload force to the translator, the preload chamber being coaxial with the stator bore and the at least one bearing gap;
   one or more seal between the static assembly and the translator to limit gas flow from the preload chamber entering the magnetic circuit airgap;
   wherein the preload chamber is defined by a side wall, a first end wall and a second end wall comprising a movable part movable with the translator;
   wherein the at least one bearing gap and the magnetic circuit airgap are coaxial; and
   wherein the at least one gas bearing journal formed on the translator also provides a sealing surface for the one or more seal.

2. The actuator of claim 1, wherein the movement of the movable part of the second end wall is coaxial with the stator bore.

3. The actuator of claim 1, further comprising a test subject mounting point fixed to the translator.

4. The actuator according to claim 1, wherein the at least one gas bearing acts upon the at least one gas bearing journal on the outer surface of the translator.

5. The actuator according to claim 1, wherein the translator is hollow and slides axially along a central core.

6. The actuator according to claim 5, wherein the at least one gas bearing acts upon the at least one gas bearing journal on the inner surface of the translator.

7. The actuator according to claim 1, wherein the LEM is a moving magnet machine.

8. The actuator according to claim 7, wherein the LEM is a slotless stator machine.

9. The actuator according to claim 1, wherein the LEM is a flux switching machine or a reluctance machine.

10. The actuator according to claim 1, further comprising an encoder connected to the translator wherein the encoder senses one or more of position or velocity and uses at least one optical, magnetic, or mechanical sensor.

11. The actuator of claim 1, wherein at least one bearing gap includes a plurality of axial extending arcuate cross section channels arranged around the translator.

12. The actuator according to claim 1, wherein the at least one bearing gap is either cylindrical or includes two or more arcuate sections.

13. The actuator according to claim 1, wherein the actuator includes an actuator housing body housing the LEM, the housing body containing one or more cooling channels.

14. The actuator according to claim 1, further comprising a hydrodynamic bearing or a hydrostatic bearing.

15. The actuator according to claim 1, wherein the preload chamber is adjacent the static assembly.

16. The actuator according to claim 1, wherein the one or more seal is provided by a seal component mounted on or in the stator and/or the at least one gas bearing.

17. The actuator according to claim 1, wherein the one or more seal is provided by the stator and/or at least one gas bearing itself.

* * * * *